United States Patent [19]

Chiesi

[11] Patent Number: 4,904,177
[45] Date of Patent: Feb. 27, 1990

[54] VERTICAL PRESS FOR THE MOULDING OF PLASTICS MATERIALS, PARTICULARY THERMOSETTING PLASTICS MATERIALS

[75] Inventor: Franco Chiesi, Milan, Italy

[73] Assignee: Fiat Auto S.p.A., Torino, Italy

[21] Appl. No.: 273,446

[22] Filed: Nov. 18, 1988

[30] Foreign Application Priority Data

Dec. 3, 1987 [IT] Italy ............................. 68040 A/87

[51] Int. Cl.⁴ .................. B29C 45/67; B29C 33/24
[52] U.S. Cl. .................. 425/406; 425/451.2; 425/451.9; 425/454; 425/457; 425/589; 425/DIG. 223; 249/162
[58] Field of Search .............. 425/451.2, 451.9, 454, 425/457, DIG. 221, DIG. 223, 453, 450.1, 590, 591, 595, 589, 406; 249/162

[56] References Cited

U.S. PATENT DOCUMENTS

| | | | |
|---|---|---|---|
| 3,507,507 | 4/1970 | Tobler et al. | 279/4 |
| 3,663,027 | 5/1972 | Klipping | 279/4 |
| 4,552,524 | 11/1985 | Schmidts et al. | 425/406 |
| 4,565,517 | 1/1986 | Brinkman et al. | 425/451.2 |
| 4,693,448 | 9/1987 | Proksa et al. | 249/162 |
| 4,725,214 | 2/1988 | Piazza et al. | 425/149 |

*Primary Examiner*—Jay H. Woo
*Assistant Examiner*—K. P. Nguyen
*Attorney, Agent, or Firm*—Sughrue, Mion, Zinn, Macpeak & Seas

[57] ABSTRACT

A vertical press for the moulding of plastics materials, particularly thermosetting plastics materials includes a fixed plate and a movable plate slidable on guide columns, a first fluid-operated actuator for moving the movable plate along the guide columns, fluid-operated clamps associated with the movable plate for clamping the movable plate relative to the guide columns, and a second fluid-operated actuator acting on the guide columns to move the columns vertically relative to the fixed plate.

1 Claim, 2 Drawing Sheets

VERTICAL PRESS FOR THE MOULDING OF PLASTICS MATERIALS, PARTICULARY THERMOSETTING PLASTICS MATERIALS

BACKGROUND OF THE INVENTION

The present invention relates to a vertical press for the moulding of plastics materials, particularly thermosetting plastics materials.

Vertical presses for thermosetting plastics materials are known which are provided with a fixed plate and a movable plate having large cylinders which move the movable plate towards the fixed plate. Due to the large dimensions of the actuator cylinders, the movement of the movable plate in these presses involves movements of large quantities of oil.

Vertical presses are also known which are provided with mechanical means for clamping the movable plate and with actuator means which cause upward vertical movement of the other plate. This system involves great complications, particularly when an injection unit is installed, since it is necessary also to move the injection unit during the injection-compression process.

SUMMARY OF THE INVENTION

The object of the present invention is to produce a press which enables high-speed operation with reduced quantities of oil and whose height is less than that of current presses.

This object is achieved by virtue of a vertical press characterised in that it comprises:

a support structure, a fixed plate supported by the structure and a movable plate slidably mounted on guide columns associated with the support structure and extending perpendicular to the fixed plate, first fluid-operated actuator means for moving the movable plate along the guide columns, fluid-operated clamping means associated with the movable plate for clamping the movable plate relative to the guide columns, and second fluid-operated actuator means acting on the guide columns to move the guide columns vertically relative to the fixed plate.

BRIEF DESCRIPTION OF THE DRAWINGS

Further characteristics and advantages of the press according to the invention will become clear from the detailed description which follows with reference to the appended drawings, provided purely by way of non-limiting example, in which.

DETAILED DESCRIPTION OF THE INVENTION

Figure 1:
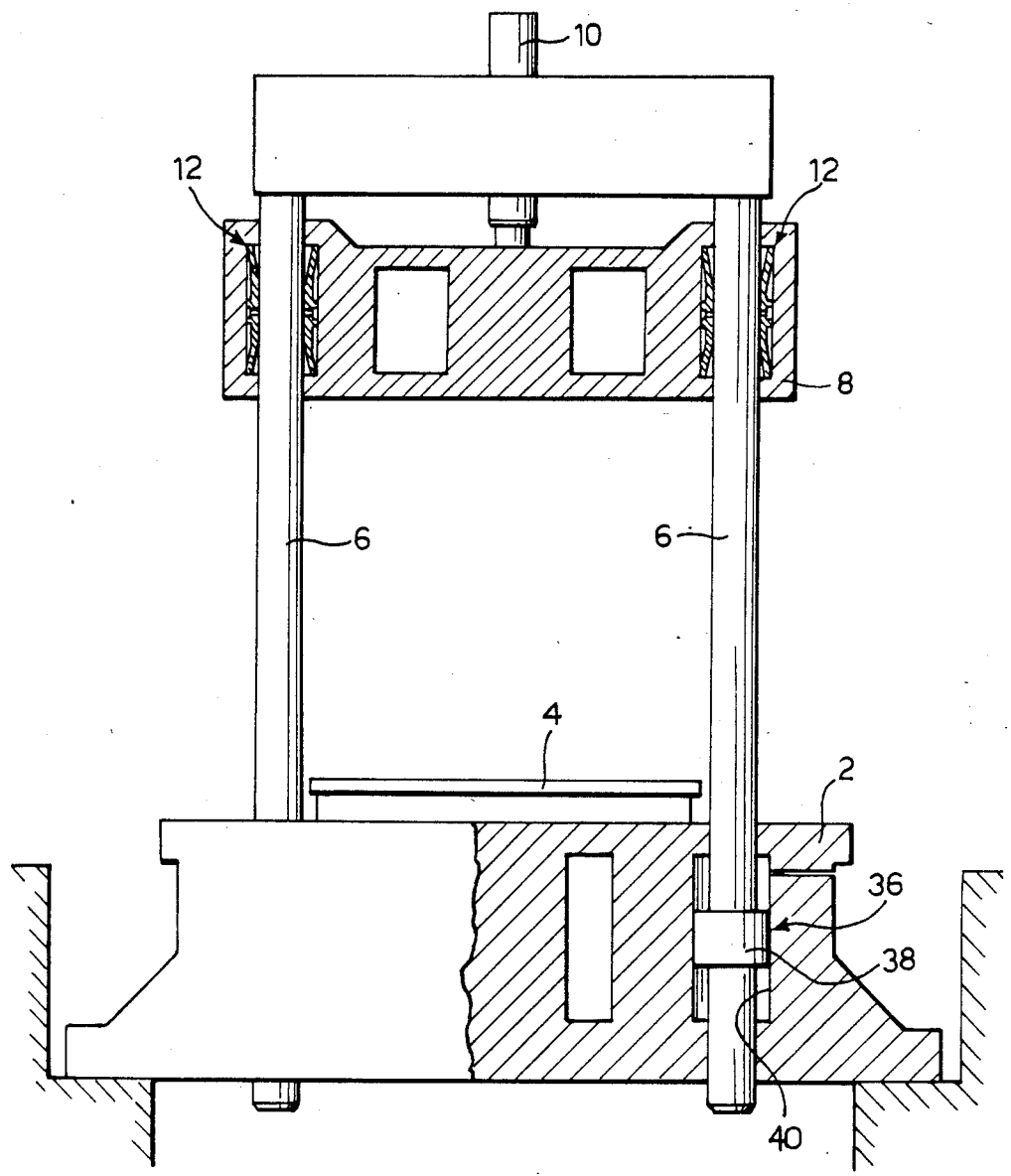
FIG. 1 is a partially-sectioned front elevational view of a vertical press according to the invention.

With reference to the drawings, a vertical press comprises a support structure 2 on which a fixed plate 4 is mounted. Four guide columns 6 on which a movable plate 8 is slidably mounted extend from the support structure, perpendicular to the fixed plate. The plate 8 is operated by means of an oleodynamic actuator 10 which moves this plate along the guide columns. Four clamping devices, generally indicated 12, are associated with the movable plate and each acts on a respective guide column 6.

Figure 2:
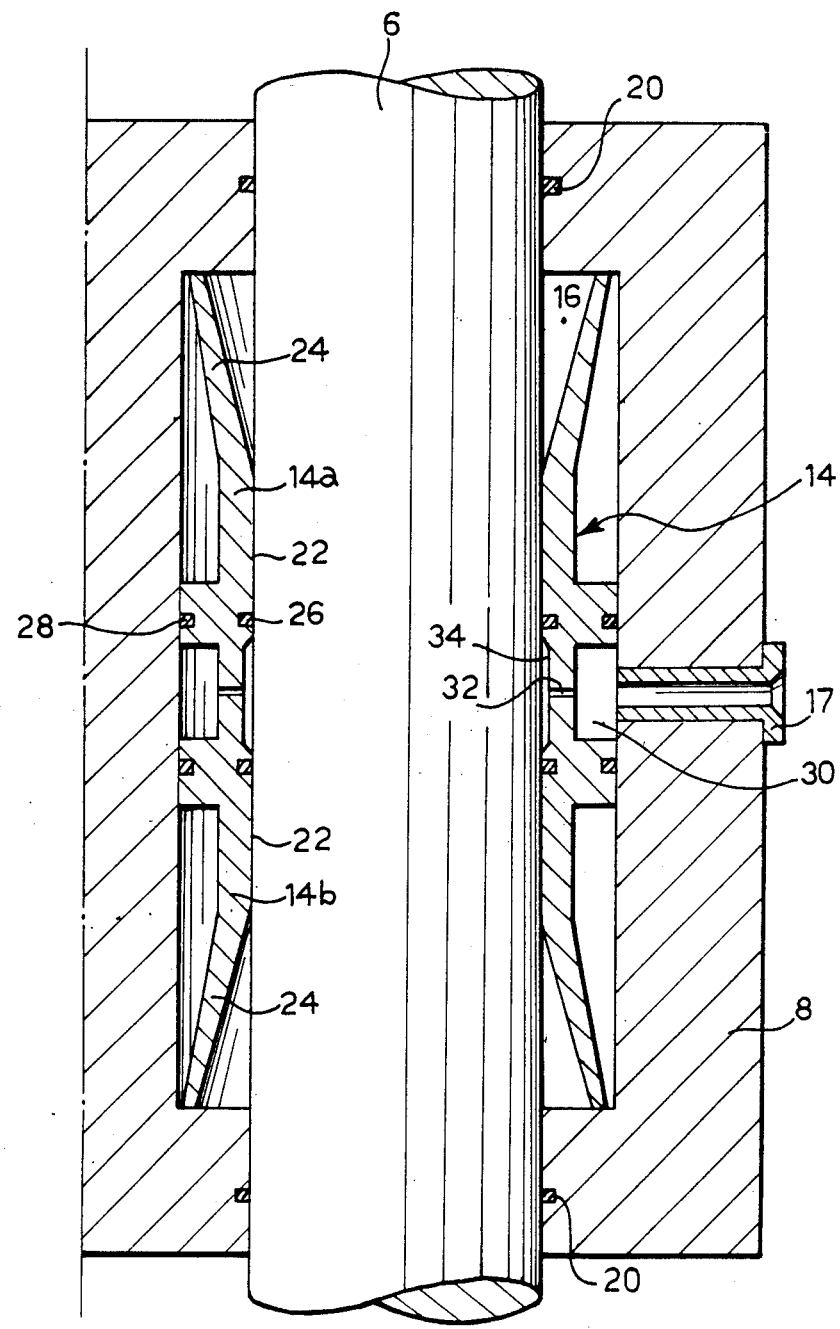
FIG. 2 is a section of a detail of FIG. 1 on an enlarged scale.

Each clamping device, illustrated in greater detail in FIG. 2, comprises a bush-like element 14 of annular section formed by 2 adjacent annular half-elements 14a and 14b which surround the respective guide column 6 and are housed in a respective cylindrical chamber in the plate 8. Oil is supplied under pressure to the cylindrical chamber through a tubular connector 17 and causes elastic deformation of the steel annular half-elements 14a and 14b, thus clamping the movable plate to the guide column. The chamber 16 is sealed by means of sealing rings 20.

In the embodiment illustrated in FIG. 2, each annular half-element 14a and 14b includes a circular cylindrical portion with a friction surface 22 and a frusto-conical end portion 24.

Sealing rings 26 and 28 are interposed between each annular half-element and the guide column and the wall of the cylindrical chamber 16, respectively. The pressurised oil is supplied through the duct 17 into an annular chamber 30 defined between the element 14 and the wall of the cylindrical chamber and from there, through a passage 32 between the two half-elements, into a second annular chamber 34 defined between the 2 half-elements and the guide column. The sealing rings 26 prevent the pressurised oil from infiltrating and coming into contact with the friction surface 22.

Second actuator means, generally indicated 36, are associated with the guide columns 6 for moving them relative to the fixed plate 4. For this purpose, the lower end of each column acts as a double-acting piston 38 within a cylindrical chamber 40 formed in the support element 2.

The operation of the press according to the invention provides for a first stage of movement of the movable plate towards the fixed plate at high speed by means of the operation of the oleodynamic cylinder 10. During this stage, high oil pressures are not required and the oleodynamic cylinder may be of small section. The movable plate is then clamped at a prescribed distance from the fixed plate by means of the operation of the clamping means 12, after which begins the stage of downward movement of the movable plate at high pressure, by means of the actuators 36 acting on the columns. The system for clamping the movable plate to the columns enables movement at high pressure to be achieved with a small quantity of oil.

Furthermore, it is possible to supply the pressurised oil to the clamping means 12 and to the actuators 36 by means of a single source of pressurised oil.

Naturally, the principle of the invention remaining the same, the forms of embodiment and details of construction may be varied widely with respect to those described and illustrated purely by way of non-limiting example.

I claim:

1. A vertical press for the moulding of plastics materials, comprising:
    a support structure,
    a fixed plate supported by said structure, guide columns movably mounted on said fixed plate perpendicular thereto and a movable plate slidably mounted on said guide columns;
    first fluid-operated actuator means connected between said columns and said movable plate for moving said movable plate along the guide columns;

a plurality of fluid-operated clamping means carried by said movable plate for clamping said movable plate against relative movement with respect to each guide column; and second fluid-operated actuator means on said fixed plate acting on said guide columns to move said guide columns vertically relative to said fixed plate;

wherein each of said fluid-operated clamping means is comprised of an annular recess in said movable plate surrounding one of said columns, a pair of annular steel bushing elements located in said recess in spaced relation to each other to define an annular pressure chamber therebetween, fluid passage means extending through said movable plate into communication with said pressure chamber for supplying pressurized fluid to said chamber, each of said bushing elements having a first portion disposed in sliding engagement with said bushing, sealing means between said first portion and said movable plate and said column, respectively, a second portion spaced from said recess and having a circular cylindrical friction surface disposed in engagement with said column, and a frusto-conical part spaced from a bottom wall of said recess and said column and extending between said second portion and an end wall of said recess whereby upon introduction of pressurized fluid into said pressure chamber each of said annular bushings will undergo elastic deformation to clamp said movable plate to said guide column.

* * * * *